Patented June 28, 1938

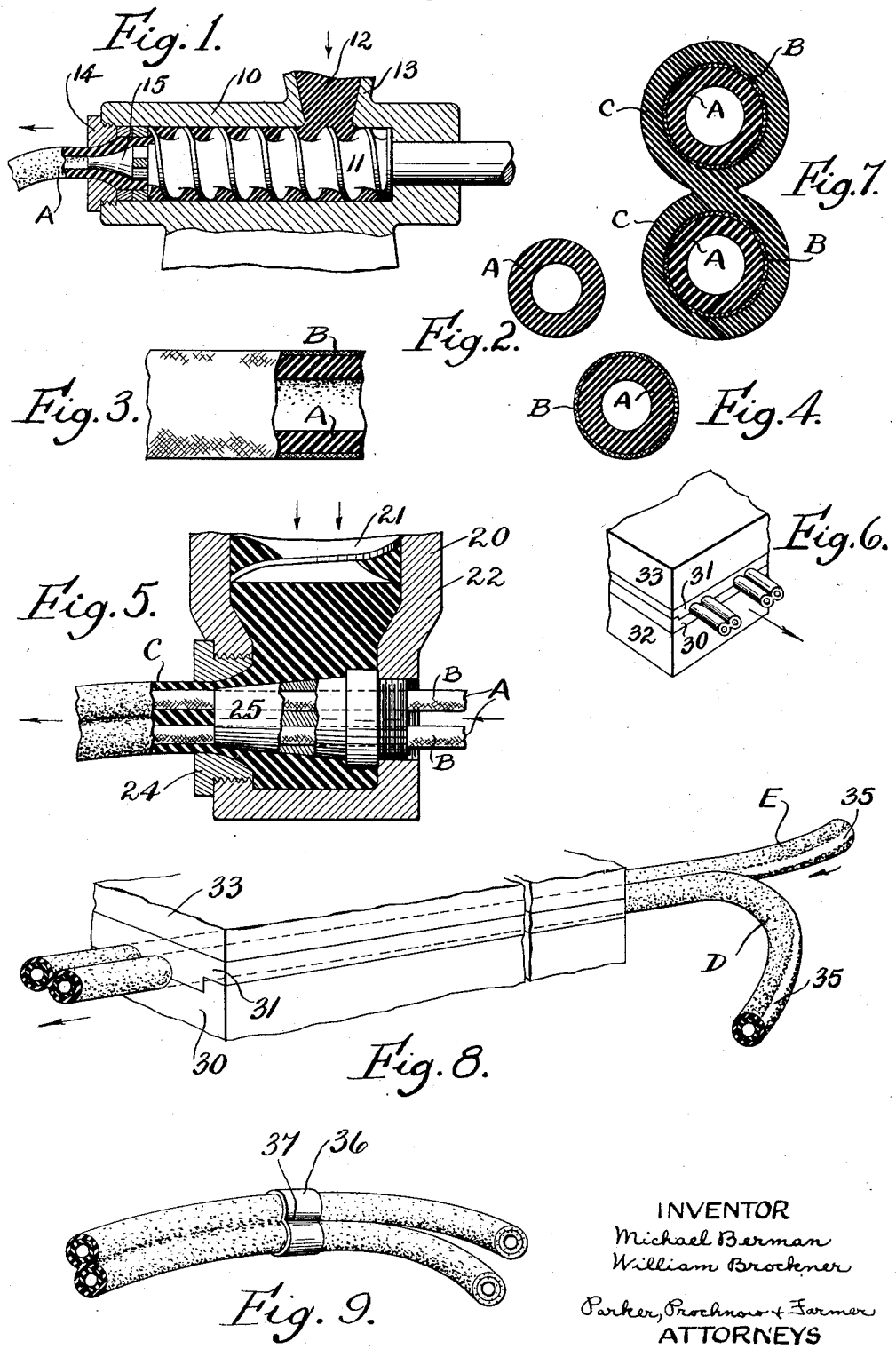

2,122,335

UNITED STATES PATENT OFFICE 2,122,335

METHOD OF MAKING MULTIPLE PASSAGE HOSE

Michael Berman and William Brockner, Buffalo, N. Y., assignors to Hewitt Rubber Corporation, Buffalo, N. Y.

Application April 9, 1936, Serial No. 73,457

10 Claims. (Cl. 18—59)

This invention relates to improvements in rubber covered hose.

In many instances, it is desirable to deliver two or more fluids from different sources to a common delivery point, as for example in the case of oxygen and acetylene gases, hydrogen and oxygen gases, or other gases which may be used for welding or heating and which may be conducted from separate tanks through hose to a point at which combustion takes place. Similarly in fire extinguishing, dilute sulfuric acid and sodium carbonate solutions may be conducted from separate sources and through separate hose to a common discharge point. When ordinary hose is used for purposes of this kind, particularly when the hose is of small diameter and of considerable length, snarling and tangling of the different lengths of hose occurs very frequently, thus resulting in delays to disentangle the hose.

One object of this invention is to provide an improved method of making hose of this kind. Another object is to provide a method according to which two or more lengths of hose can be provided with a single integral outer covering by means of an extruding die. Still another object of the invention is to provide a method whereby two or more lengths of hose can be formed separately and then treated to cause the outer covering of the hose to be vulcanized as a single integral piece.

Other objects of this invention will appear from the following description and claims.

In the accompanying drawing:

Fig. 1 is a longitudinal vertical sectional elevation of an extruding machine for forming the inner layers or tubing of hose embodying this invention.

Fig. 2 is a transverse sectional elevation of tubing formed by means of the extruding machine shown in Fig. 1.

Figs. 3 and 4 are respectively a longitudinal sectional elevation and a transverse section of similar tubing having a fabric layer applied about the same.

Fig. 5 is a fragmentary central sectional elevation of another extruding machine for forming an outer cover about the fabric covered tubing.

Fig. 6 is a fragmentary perspective view on a reduced scale of a portion of a vulcanizing apparatus in which hose embodying this invention may be vulcanized.

Fig. 7 is a transverse section of hose embodying this invention.

Fig. 8 is a fragmentary perspective view of a vulcanizing apparatus showing the same operating on hose formed in single lengths and treated to form an integral outer covering for the same, a portion of one length of hose at the right hand end of the figure being bent out of its normal position to show the surfaces of the two adjacent lengths which are to be secured together.

Fig. 9 is a fragmentary perspective view of an end portion of a piece of hose embodying this invention.

In the manufacture of our improved hose, it is desirable to first form the inner tube of the hose by means of an extruding machine. Any suitable extruding machine may be employed, and as shown in Fig. 1, the machine has the usual cylindrical housing 10, in which a helical conveyor or feed screw 11 is arranged to which an unvulcanized rubber composition 12 may be fed through a hopper 13. At the discharge end of the housing, an extruding die 14 is arranged which cooperates with an inner die 15 suitably secured within the housing 10, to form tubing A. It will be obvious that upon turning of the helical screw 11, the unvulcanized rubber composition will be forced through the extruding die in the form of a tube which will be about the consistency of firm dough. The tube may then be given a brief cure in steam for the purpose of securing the necessary firmness to resist the pressures to which it will be subjected later in the manufacturing process, or the tube may be compounded to such a firm consistency that preliminary vulcanization may be omitted.

The next step in the manufacture of the hose preferably includes placing the fabric reinforcement about the extruded tubing. This may be done in any suitable or desired manner, either by wrapping the tubing with canvas, or by braiding a cord reinforcement about the tubing, or both. Any number of layers of fabric may be employed, only one layer B being shown in the construction illustrated. After the fabric reinforcement is placed on the tubing, the hose may then be "semi-cured" by passing steam at low pressure into the interior of the tube, thus vulcanizing it and at the same time expanding it into the braid or fabric placed about it. The vulcanization imparts to the rubber composition a greater degree of rigidity. Such hose may be made in any suitable lengths, since the extrusion process can, of course; be carried on continuously so long as the unvulcanized rubber composition is fed into the hopper 13. Two or more of these lengths of hose may then be passed through an extruding machine, such for example as shown in Fig. 5, so that a single outer covering may be placed around two or more parallel lengths of the fabric reinforced tubing at one time. In Fig. 5, 20 represents the cylindrical shell or housing of the extruding machine, and 21 the helical conveyor or feed screw for the unvulcanized rubber composition 22, which may, if desired, differ from the composition 12 used in the forming of the tubing. The extruding machine is provided with an extruding die 24, which has an aperture therein of a shape corresponding to the cross section ultimately desired in the finished hose. An inner die 25 is also provided in connection with this extruding nozzle and this inner die is provided with two or more apertures extending lengthwise thereof and through which two or more lengths of reinforced tubing A may be passed in the direction indicated by the arrows in Fig. 5, so that the die 25 correctly spaces the several lengths of tubing with respect to each other and with respect to the extruding die 24. Consequently, by means of the dies 24 and 25, a single or one piece outer covering C is formed at one time about the several lengths of fabric reinforced tubing. The uncured hose when extruded from the die 24 is, of course, covered with powdered soapstone or other material in the usual manner to prevent sticking to other portions of the hose or to other materials.

The hose is then ready to be cured or vulcanized and this may be done in any suitable or desired manner. For example, the curing may be effected by the well known lead sheath process or in vulcanizing or platen press, such as illustrated in Fig. 6, in which a pair of mold plates 30 and 31 are shown, which, when brought together as shown in Fig. 6, are provided with a series of grooves or cavities of the proper size and shape to form the outside contour of the hose, the cavities for a twin hose, for example, being so arranged that two adjacent cylindrical cavities connect to form the connection between adjacent lengths of the hose. The mold plates 30 and 31 are secured respectively to steam platens 32 and 33, one of which is movable relatively to the other. The extruded hose after leaving the extruding machine shown in Fig. 5, is consequently laid in lengths in the grooves of the platen press shown in Fig. 6, while the mold plates and platens are separated. The same are then brought together as shown in Fig. 6 and the lengths of hose are then cured or vulcanized by heat of the steam contained within the platens or steam chambers 32 and 33. The hose while being vulcanized is filled with air or water under pressure. Upon completion of the vucanizing operation, it will be found that the single cover C of the two or more adjacent lengths of hose is formed as an integral rubber member as shown in Fig. 7.

Under certain conditions, it may be more desirable to make our improved hose by forming each length of hose with its own cover, and then securing and vulcanizing the covers together. This may be done by passing only a single length of semi-cured or unvulcanized tubing A through an extruding machine, such as shown in Fig. 5, but the die 25 formed to feed only a single length of tubing through an extruding die shaped to form a single cover about a single tube. In other words, the separate lengths of hose are formed in the same manner now commonly used in forming ordinary or single passage hose. When this is done, two separate lengths of such hose with their covers unvulcanized are brought together and formed into a single multiple passage hose. This is preferably done as illustrated in Fig. 8 by removing from adjacent portions of the surface of two lengths of tubing D and E, a portion of the covering of soapstone or other dusting material. This can readily be done in any suitable or desired manner, for example, by removing such material with gasoline or other solvent. These portions 35 free from soapstone or the like are clearly shown in Fig. 8, and are then brought into contact as the tubing is placed into the grooves of the mold plates 30 and 31 of the platen press, so that the cleaned contacting portions of the lengths of hose are located in the intersecting portions of the grooves or cavities in the mold plates. During the vulcanization of the hose in the press, the covers of the two separate pieces of tubing D and E are vulcanized together into an integral cover member because of the joining of the adjacent cleaned portions 35 of the hose lengths D and E. By means of this modified method it is possible to produce hose in which the several adjoining lengths thereof are made of different colors. For example, when hose of this kind is used in connection with oxyacetylene welding apparatus, hose of one color may be used for conducting oxygen and hose of another color for acetylene.

The hose formed in accordance with the herein described method has the advantage that its tendency to snarl and coil is very greatly reduced, and furthermore, the knotting of one hose about another is entirely prevented. While the hose shown includes only two tubes or passages, it will be understood that it is not intended to limit the invention to two passages, since obviously three or more lengths of hose may be integrally connected as herein described. Preferably the hose is so formed that the outer surfaces of the covers of the individual lengths of hose are arranged in substantially tangential relation to each other, as shown in Fig. 7, yet contours of the outer surfaces of individual lengths may intersect each other by spacing the centers of the individual lengths closer together, or the centers may be spaced farther apart than shown in Fig. 7.

When the hose is so formed that the covering material therefor is of substantially uniform thickness throughout each length of hose, the end portions of adjacent lengths of hose may be separated, as may, for example, be desired for connecting one length to one tank and another length to another tank, or for connecting the opposite ends thereof to different connections of a torch or nozzle. The end portions of adjacent lengths of hose can readily be separated by slitting or cutting the integral connection between adjacent lengths of hose, or if the hose is made according to the modified method shown in Fig. 8, the end portions may be left completely covered with soapstone or the like, so that they will not be vulcanized together. When the hose is provided with separated ends, it is preferable to provide at the juncture of the cut or separated ends and the integrally connected part of the hose a band of any suitable form to prevent further separating of the two lengths of hose or to prevent tearing the cover of the hose at the end of the cut or separation. As illustrated in Fig. 9, this can easily be done by placing about the hose a metal band 36, which initially may be of elliptical or other form so as to pass easily over the multiple passage hose and the portions of this band adjacent to the juncture of adjacent lengths of hose may be pressed inwardly by means of a suitable die or implement to form grooves or depressions 37 at opposite sides thereof, which enter into the corresponding grooves or depressions between adjacent lengths of hose. The formation of these depressions in the band 36 also causes this band to contract about the hose so as to be securely held in place thereon. Any other means for reinforcing the hose at the juncture of the separated ends and the integral connection between adjacent lengths may be provided.

We claim as our invention:

1. A method of making a multiple passage hose, including forming a tube for each passage of said hose, partly vulcanizing said tubes, placing a fabric reinforcement about each tube, forming a cover of uncured rubber of substantially uniform thickness about said tubes with a portion of the cover of one tube connected with a portion of the cover of another tube, said connecting portion extending around materially less than one-fourth of the periphery of each cover, admitting fluid pressure into each tube, and vulcanizing said hose under pressure while said covers are connected to form an integral vulcanized rubber connection between adjacent lengths of hose.

2. A method of making a multiple passage hose, including extruding tubing to form the inner layer of hose, briefly curing said tubing forming a fabric reinforcement about said tubing, encasing said tubing in an unvulcanized rubber cover, placing a plurality of lengths of said hose into contact to cause the same to adhere, admitting fluid pressure into each tube and vulcanizing said hose with less than one-fourth of the peripheral portions of said covers in contact, to form an integral vulcanized rubber connection between the covers of adjacent lengths of said hose.

3. A method of making a multiple passage hose, including the steps of forming and partially curing rubber tubing, forming a cover of unvulcanized rubber about said partially cured rubber tubing, placing a plurality of lengths of said covered tubing into contact to cause the unvulcanized cover of one length of tubing to adhere to the cover of an adjacent length of tubing, and vulcanizing said hose while under internal pressure with less than one-fourth of the peripheral portions of said covers in contact to form an integral vulcanized rubber covering extending about a plurality of lengths of tubing arranged side by side.

4. A method of making a multiple passage hose, including the steps of forming and partially curing rubber tubing, forming a cover of unvulcanized rubber about said partially cured rubber tubing, dusting the exterior of said cover to prevent adhesion of the same to other surfaces, arranging portions of a plurality of lengths of said hose with unvulcanized covers adjacent to each other, removing the dusting material from adjacent portions of said lengths, pressing together said portions from which the dusting material has been removed to cause said unvulcanized covers to adhere to each other, along less than one-fourth of the peripheral surfaces of said covers, and vulcanizing said hose while under internal pressure with said covers adhering to each other to form an integral vulcanized rubber connection between the adjacent lengths of hose which extends around less than one-fourth of the peripheral surfaces of said lengths of hose.

5. A method of making a multiple passage hose, including extruding rubber tubing, partly curing the same, placing fabric reinforcement about said partly cured tubing, placing a plurality of lengths of said tubing into side by side relation to each other, simultaneously extruding a rubber covering about each of said adjacent lengths of tubing, the extruded cover of one tube being joined to the extruded cover of an adjacent tube at less than one-fourth of the periphery of said covering, and vulcanizing the hose while under internal pressure to form an integral vulcanized rubber connection between the covers of adjacent lengths of said hose.

6. A method of making a multiple passage hose, including extruding rubber tubing, partly curing the same, placing a plurality of lengths of said tubing into side by side relation to each other, passing said lengths of tubes while in side by side relation through an extruding die, and simultaneously extruding a covering about said lengths of tubing while passing through said die, the covers of adjacent lengths of tubing being joined at materially less than one-fourth of the peripheries of said covers, and vulcanizing said hose while under internal pressure to form an integral vulcanized connection between the covers of adjacent lengths of hose.

7. A method of making a multiple passage hose, including extruding rubber tubing, partly curing said tubing, placing a fabric reinforcement about said tubing, arranging a plurality of lengths of said tubing in side by side and spaced relation to each other and extruding a single integral cover of substantially uniform thickness simultaneously about all of said adjacent lengths of tubing, with less than one-fourth of the peripheries of the covers of said lengths joined, and vulcanizing said hose, while under internal and external pressure, to form a single piece cover for said plurality of lengths of tubing.

8. A method of making a multiple passage hose, including forming a tube for each passage of said hose, placing a fabric reinforcement about each tube, covering said tubes with uncured rubber which completely covers each tube, the composite multiple passage hose thus formed having the covering of one tube contacting with and connected with the covering of another tube, placing the covered tubes into parallel connected grooves of mold plates, admitting fluid pressure into said tubes, and applying heat to the mold plates to vulcanize said hose.

9. A method of making a multiple passage hose, including forming a fabric reinforced tube for each passage of said hose, covering said tubes with uncured rubber which completely covers each tube, the composite multiple passage hose thus formed having the portion of the covering of one tube contacting with and connected with the portion of the covering of another tube, confining a plurality of said covered and connected tubes while arranged in substantially parallel relation to each other and adjacent to each other by a relatively rigid wall extending around the greater part of the periphery of each covered tube and having a connecting passage at the portions of said covers adjacent to each other to permit formation of an integral rubber connection between adjacent portions of the covers of said tubes, admitting fluid pressure into said tubes, vulcanizing the rubber of the hose while confined by said wall and while under pressure, and removing the hose from said wall after vulcanization.

10. A method of making a multiple passage hose, including forming a tube for each passage of said hose, placing a fabric reinforcement about each tube, forming a cover of uncured rubber completely about each tube, bringing the covers of a plurality of said tubes in contact with each other over a minor portion of their peripheries, confining said tubes with their covers in contact with each other in a substantially rigid wall extending about said connected covered tubes, admitting fluid pressure into said tubes, vulcanizing the rubber of said hose while confined by said wall and while under pressure, and removing the hose from said wall after vulcanization.

MICHAEL BERMAN.
WILLIAM BROCKNER.